Patented July 18, 1944

2,353,970

UNITED STATES PATENT OFFICE 2,353,970

METHOD OF IMPROVING THE PHYSICAL PROPERTIES OF A SYNTHETIC HYDRATED MAGNESIUM SILICATE DECOLORIZING MATERIAL

Max Y. Seaton, Greenwich, Conn., assignor, by mesne assignments, to Lyle Caldwell, Los Angeles, Calif.

No Drawing. Application July 7, 1941,
Serial No. 401,336

10 Claims. (Cl. 252—300)

This invention relates to a process for the production of a decolorizing material, and pertains particularly to the production of an improved decolorizing material or adsorbent from a synthetic hydrated magnesium silicate of the type characterized by those produced according to the teachings of U. S. patents, Nos. 2,076,545, 2,163,525, 2,163,526, and 2,163,527, granted to Lyle Caldwell.

One of the particular objects of this invention is to provide a recess for the preparation of a decolorizing or adsorbent material of enhanced decolorizing power from a synthetic hydrated magnesium silicate material which itself has important adsorbent characteristics.

Synthetic hydrated magnesium silicates of the type characterized by those produced according to the teachings of the above enumerated Caldwell patents have found wide use in the purification and bleaching of oils, solvents and the like, and for the most part the filtration characteristics of such silicates constitute a secondary consideration. Under certain conditions of use, however, the filtration characteristics of the material become quite important and various artifices have been resorted to to improve such characteristics. The most common practice in the past has been that of admixing with the silicate decolorizing material an otherwise inert constituent which would serve as a "filter aid" to improve the filtration properties. Such admixtures serve as diluents, resulting in a decreased decolorizing effectiveness of the mixture when compared to the original synthetic magnesium silicate.

Accordingly, it is one of the principal objects of this invention to provide a process of treating such a synthetic hydrated magnesium silicate to improve the filtration characteristics thereof without detriment to the overall decolorizing or bleaching characteristics of such material.

In its more preferred embodiments, the invention is directed to the treatment of a synthetic hydrated magnesium silicate in the production of an improved product of enhanced decolorizing properties as well as enhanced filtration properties.

The method of this invention comprises, essentially, the steps of subjecting a synthetic hydrated magnesium silicate decolorizing material to contact with an alkali metal silicate in aqueous solution, to cause fixation of such alkali metal silicate on such decolorizing material, and subsequently drying the resulting solid material comprising said hydrated magnesium silicate with said alkali metal silicate fixed thereon, to produce a pulverulent product.

According to the above-mentioned patents granted to Lyle Caldwell, hydrated magnesium silicate decolorizing materials are produced by hydrothermal reaction (i. e., by chemical reaction in the presence of water at a superatmospheric temperature) between a soluble magnesium compound and solid starting material containing lime and silica. The solid starting material may comprise a single compound in which the lime and silica are chemically combined with each other at the start of the reaction, or a mixture of two or more materials containing lime and silica wholly or partly uncombined with each other at the start of the reaction. Thus, such a hydrated magnesium silicate decolorizing material may be produced by hydrothermal base-exchange reaction between a soluble magnesium salt (such as magnesium chloride or magnesium sulphate) and calcium silicate; or by such a base-exchange reaction in the presence of added silica or added lime (as, for example, calcium hydroxide or calcium carbonate); or by hydrothermal reaction between silica, lime (as, for example, calcium hydroxide or calcium carbonate) and a soluble magnesium salt. Reference is made to the aforesaid patents for more detailed descriptions and examples of starting materials and conditions employed in preparing such synthetic hydrated magnesium silicates.

As a specific example of the practice of the invention, I may take a water slurry of a synthetic hydrated magnesium silicate as it would result from any of the processes set forth in the aforesaid Caldwell patents, i. e., in a condition just prior to final drying, in which the slurry may contain from 15% to 20% total solids. To this slurry is added sufficient alkali metal silicate to be equal to from about 1% to 25% of the solids weight. After thorough mixing, the slurry is conveyed to a drying means, such as a rotary dryer, where the water is evaporated to yield a pulverulent product containing a preferred moisture content, which may be varied between zero and 20% in the same manner and for the same reasons as are encountered in the production of any inorganic adsorbent material, as is well known in the art.

As is above recited, the proportion of alkali metal silicate may be established at between about 1% and 25% of the weight of the synthetic magnesium silicate. The more preferred proportion is between 5% and 10%, with an optimum at about 7½%.

Alkali metal silicates are available commercially which contain varying proportions of silicate to alkali. I have successfully used such alkali metal silicates in the present process with silicate:alkali ratios from 1.2 to 1, to 4.0 to 1, with a resultant improvement both in the decolorizing and filtration characteristics of the synthetic hydrated magnesium silicate base material. For example, with specific reference to the use of sodium silicate in the process of this invention, using about 6% to 7% of silicate in each instance, the following test results were obtained:

| Test | Mol ratio SiO₂:Na₂O sodium silicate added | Percent dried product moisture content | Activity As is | Activity Zero moisture | Filter time, seconds |
|---|---|---|---|---|---|
| A | None added | 2.9 | 350 | 382 | 57 |
| B | 1.2:1 | 7.2 | 376 | 432 | 53 |
| C | 2.5:1 | 3.4 | 396 | 424 | 54 |
| D | 4.0:1 | 7.7 | 350 | 392 | 42 |

From the above tabulation, it will be seen that the "Filter time" (which is an empirical index based upon the number of seconds required to recover a given volume of naphtha filtrate at a given temperature and pressure) decreases with an increased $SiO_2:Na_2O$ ratio; also, that the "Activity" is increased in each instance over the base material but is greatest (on the moisture-free basis) with the lowest $SiO_2:Na_2O$ ratio. For optimum results, therefore, I prefer to use an intermediate $SiO_2:Na_2O$ ratio, such as 2.5:1, wherefore an advantageous improvement in both filtration and decolorizing characteristics is obtained. (The "Activity" index is empirical, and is a measure of the adsorptive capacity of the product for oleic acid; the higher the index, the more active the material.)

The nature of the physical and/or chemical changes in the synthetic hydrated magnesium silicate decolorizing material upon contact with the alkali metal silicate solution, is not fully understood. The soluble silicate is known, however, to be substantially completely combined with the magnesium silicate material, whether chemically or physically, as is evidenced by the fact that if the aqueous phase is separated from the aforementioned slurry after a thorough mixing to assure proper contact between the soluble silicate and the magnesium silicate material, this liquid is found to have substantially the specific gravity of pure water and little or no alkali metal silicate can be found in it by analysis. Furthermore, no significant alkali metal silicate can be extracted from the dried silicated synthetic hydrated magnesium silicate by leaching or extracting with water.

Between the limits of about 1% and 25% of alkali metal silicate used in treatment of the synthetic hydrated magnesium silicate a gradual improvement in the decolorizing characteristics is obtained. The following table shows the effect on the decolorizing characteristics of the material obtained by the use of various proportions of alkali metal silicate, specifically, a sodium silicate having an $SiO_2:Na_2O$ mol ratio of approximately 2.5 to 1:

| Test No. | Sodium silicate added wt. percent | Moisture, percent | Activity As is | Activity Zero moisture |
|---|---|---|---|---|
| 92 | Zero | 15.1 | 199 | 403 |
| 93 | 1 | 4.6 | 356 | 411 |
| 94 | 2½ | 10.5 | 286 | 419 |
| 95 | 6 | 2.5 | 406 | 429 |
| 96 | 12 | 4.2 | 408 | 436 |
| 97 | 24 | 3.5 | 447 | 451 |

In addition to the improved filtration and decolorizing characteristics above noted it has been found that the silicated synthetic hydrated magnesium silicate of this invention is enhanced in two additional properties, which are of particular benefit when the decolorizing material is to be employed in the clarification, regeneration and de-odorization of dirty drycleaners' solvent, e. g., (a) an increased power of acid removal and (b) minimum "dusting." As a specific example of the improved power of acid removal, 10 grams of synthetic hydrated magnesium silicate when added to a liter of used drycleaners' solvent has removed acids equivalent to 230 mg. of KOH, whereas 10 grams of the product of the present invention made from the same synthetic hydrated magnesium silicate base material has been found to remove acids equivalent to 325 mg. of KOH under the same conditions.

The phenomenon known to the drycleaner trade as "dusting" results from a deposition of a fine powder or "dust" on the surface of the garments following solvent contact in the presence of the decolorizing material. The synthetic hydrated magnesium silicates above defined are particularly productive of the "dusting" phenomenon and for the most part cannot be used directly in the drycleaner trade. The same synthetic hydrated magnesium silicates, when treated according to the present process, are essentially free from this fault of "dusting."

The above specific example is intended to be illustrative of this invention rather than limitative, and I do not consider my invention limited to the specific disclosure herein, but rather to the scope of the subjoined claims.

I claim:

1. The method of treating a synthetic hydrated magnesium silicate decolorizing material to form a decolorizing product having improved decolorizing and filtration characteristics, which comprises: bringing a quantity of preformed synthetic hydrated magnesium silicate decolorizing material into contact with an aqueous solution of an alkali metal silicate to cause fixation of substantially all of such alkali metal silicate on said quantity of material, and drying the resulting solid material comprising said decolorizing material with said alkali metal silicate fixed thereon, to produce a pulverulent product.

2. The method set forth in claim 1 in which the quantity of alkali metal silicate employed in such contact is between about 1% and 25% by weight, based on the weight of such hydrated magnesium silicate decolorizing material.

3. The method set forth in claim 1 in which the quantity of alkali metal silicate employed in such contact is between 5% and 10% by weight, based on the weight of such hydrated magnesium silicate decolorizing material.

4. The method of treating a synthetic hydrated magnesium silicate decolorizing material to form a decolorizing product having improved decolorizing and filtration characteristics, which comprises: bringing a quantity of preformed synthetic hydrated magnesium silicate decolorizing material into contact with an aqueous solution of a sodium silicate to cause fixation of substantially all of such alkali metal silicate on said quantity of material, and drying the resulting solid material comprising said decolorizing material with said alkali metal silicate fixed thereon, to produce a pulverulent product.

5. The method set forth in claim 4 wherein the ratio of $SiO_2$ to $Na_2O$ in the sodium silicate lies between 1.2 to 1 and 4.0 to 1.

6. The method set forth in claim 4 wherein the ratio of $SiO_2$ to $Na_2O$ in the sodium silicate lies between 1.2 to 1 and 4.0 to 1 and the amount of sodium silicate employed is between 5% and 10% of the dry weight of said synthetic magnesium silicate decolorizing material.

7. The method of treating a synthetic hydrated magnesium silicate decolorizing material produced by hydrothermal reaction between a soluble magnesium compound and solid starting material comprising lime and silica, to form a pulverulent decolorizing product having improved decolorizing and filtration characteristics, which comprises: bringing a quantity of such hydrated magnesium silicate decolorizing material into contact with an aqueous solution of alkali metal silicate to cause fixation of substantially all of such alkali metal silicate on said quantity of material, and drying the resulting solid material to pulverulent condition.

8. The method set forth in claim 7 in which the quantity of alkali metal silicate employed in such contact is between about 1% and 25% by weight, based on the weight of such hydrated magnesium silicate decolorizing material.

9. The method set forth in claim 7 in which the quantity of alkali metal silicate employed in such contact is between 5% and 10% by weight, based on the weight of such hydrated magnesium silicate decolorizing material.

10. The method of treating a synthetic hydrated magnesium silicate decolorizing material produced by hydrothermal base-exchange reaction between a soluble magnesium compound and calcium silicate, to form a pulverulent decolorizing product having improved decolorizing and filtration characteristics, which comprises: bringing a quantity of such hydrated magnesium silicate decolorizing material into contact with an aqueous solution of alkali metal silicate to cause fixation of substantially all of such alkali metal silicate on said quantity of material, and drying the resulting solid material to pulverulent condition.

MAX Y. SEATON.